United States Patent
Sufleta et al.

(10) Patent No.: US 10,142,210 B2
(45) Date of Patent: Nov. 27, 2018

(54) IN-LINE TOOL PERFORMANCE MONITORING AND ADAPTIVE PACKET ROUTING

(71) Applicant: Gigamon Inc., Santa Clara, CA (US)

(72) Inventors: Zbigniew Sufleta, Cobb, CA (US); Jason Lee, Palo Alto, CA (US); Ramakrishna Manchiraju-Venkata, Sunnyvale, CA (US); Tanmay Kishore, Fremont, CA (US); Yan Xiu, San Ramon, CA (US)

(73) Assignee: Gigamon Inc., Santa Clara, CA (US)

( * ) Notice: Subject to any disclaimer, the term of this patent is extended or adjusted under 35 U.S.C. 154(b) by 326 days.

(21) Appl. No.: 14/940,877

(22) Filed: Nov. 13, 2015

(65) Prior Publication Data

US 2017/0141989 A1    May 18, 2017

(51) Int. Cl.
  *H04L 12/26*   (2006.01)
  *H04L 12/721*  (2013.01)
  *H04L 12/727*  (2013.01)
  *H04L 12/803*  (2013.01)
  *H04L 12/841*  (2013.01)

(52) U.S. Cl.
  CPC ...... *H04L 43/0888* (2013.01); *H04L 43/0852* (2013.01); *H04L 43/106* (2013.01); *H04L 45/121* (2013.01); *H04L 45/70* (2013.01); *H04L 47/125* (2013.01); *H04L 47/283* (2013.01)

(58) Field of Classification Search
  None
  See application file for complete search history.

(56) References Cited

U.S. PATENT DOCUMENTS

| | | | | |
|---|---|---|---|---|
| 6,978,223 | B2* | 12/2005 | Milliken | H04L 41/046 702/122 |
| 9,219,700 | B2* | 12/2015 | Cafarelli | H04L 49/555 |
| 9,705,775 | B2* | 7/2017 | Zhang | H04L 43/10 |
| 2003/0046388 | A1* | 3/2003 | Milliken | H04L 41/046 709/224 |
| 2007/0280222 | A1* | 12/2007 | Smith | H04L 12/5692 370/360 |
| 2008/0256138 | A1* | 10/2008 | Sim-Tang | G06F 11/1435 |
| 2011/0206055 | A1* | 8/2011 | Leong | H04L 49/00 370/401 |
| 2011/0211443 | A1* | 9/2011 | Leong | H04L 63/02 370/218 |
| 2012/0026869 | A1* | 2/2012 | Wang | H04L 41/5003 370/230 |
| 2013/0010613 | A1* | 1/2013 | Cafarelli | H04L 49/555 370/250 |
| 2013/0103830 | A1* | 4/2013 | Edwards | H04L 43/0852 709/224 |
| 2015/0195157 | A1* | 7/2015 | Nayyar | H04L 43/0852 709/224 |

(Continued)

*Primary Examiner* — Ayaz R Sheikh
*Assistant Examiner* — Faiyazkhan Ghafoerkhan
(74) *Attorney, Agent, or Firm* — Perkins Coie LLP

(57) ABSTRACT

Embodiments are disclosed for monitoring the performance of an in-line tool without adding data to network traffic routed through the in-line tool. In some embodiments, performance of the in-line tool is based on a measured latency introduced by the processing of packets through the in-line tool. In some embodiments, network traffic is adaptively routed based on the measured latency at the in-line tool.

21 Claims, 8 Drawing Sheets

(56) References Cited

U.S. PATENT DOCUMENTS

| | | | |
|---|---|---|---|
| 2015/0263922 A1* | 9/2015 | Edsall | H04L 43/028 370/252 |
| 2016/0149788 A1* | 5/2016 | Zhang | H04L 43/10 709/224 |
| 2016/0352866 A1* | 12/2016 | Gupta | H04L 67/42 |
| 2016/0380859 A1* | 12/2016 | Edsall | H04L 43/028 370/252 |
| 2017/0005902 A1* | 1/2017 | Mirsky | H04L 69/28 |
| 2017/0134247 A1* | 5/2017 | Hoja | H04L 43/04 |

* cited by examiner

IN-LINE TOOL PERFORMANCE MONITORING AND ADAPTIVE PACKET ROUTING

TECHNICAL FIELD

The present disclosure generally relates to network switching and monitoring technology, and more particularly to measuring the performance (e.g. latency) of in-line tools and redirecting network traffic based on the measured performance of the in-line tools.

BACKGROUND

With ever-increasing amounts of data traffic on modern computer networks, network monitoring and security measures play an increasingly important role in reducing the vulnerability of a network to intrusion, unauthorized access and other security or performance issues. Tools can be deployed in a computer network that process the network traffic and provide monitoring and security services. Examples of network monitoring tools include an intrusion detection system (IDS), an intrusion prevention system (IPS), a sniffer, a network monitoring system, an application monitoring system, an intrusion detection system, a forensic storage system, an application security system, among others. However, tools are only as effective as the network traffic that they can see. Existing approaches involve deploying multiple editions of the same tool across a computer network to increase visibility to the network traffic. This can be expensive and difficult to scale and manage.

A network switch communicatively coupled between communicating nodes on a computer network can route packets to centralized tools for processing. To be more responsive to emerging security threats, many out-of-band tools which used to passively monitor traffic are moving to in-line deployments. In an in-line deployment, packets originating from one node on a computer network are routed through the in-line tool before continuing on to another node on a computer network.

BRIEF DESCRIPTION OF THE DRAWINGS

The present disclosure is illustrated by way of example, and not by way of limitation, in the figures of the accompanying drawings and in which like reference numerals refer to similar elements. The figures of the accompanying drawings depict only example embodiments of the present disclosure and are therefore not to be construed as limiting. In the drawings.

DETAILED DESCRIPTION

Overview

Figure 1:
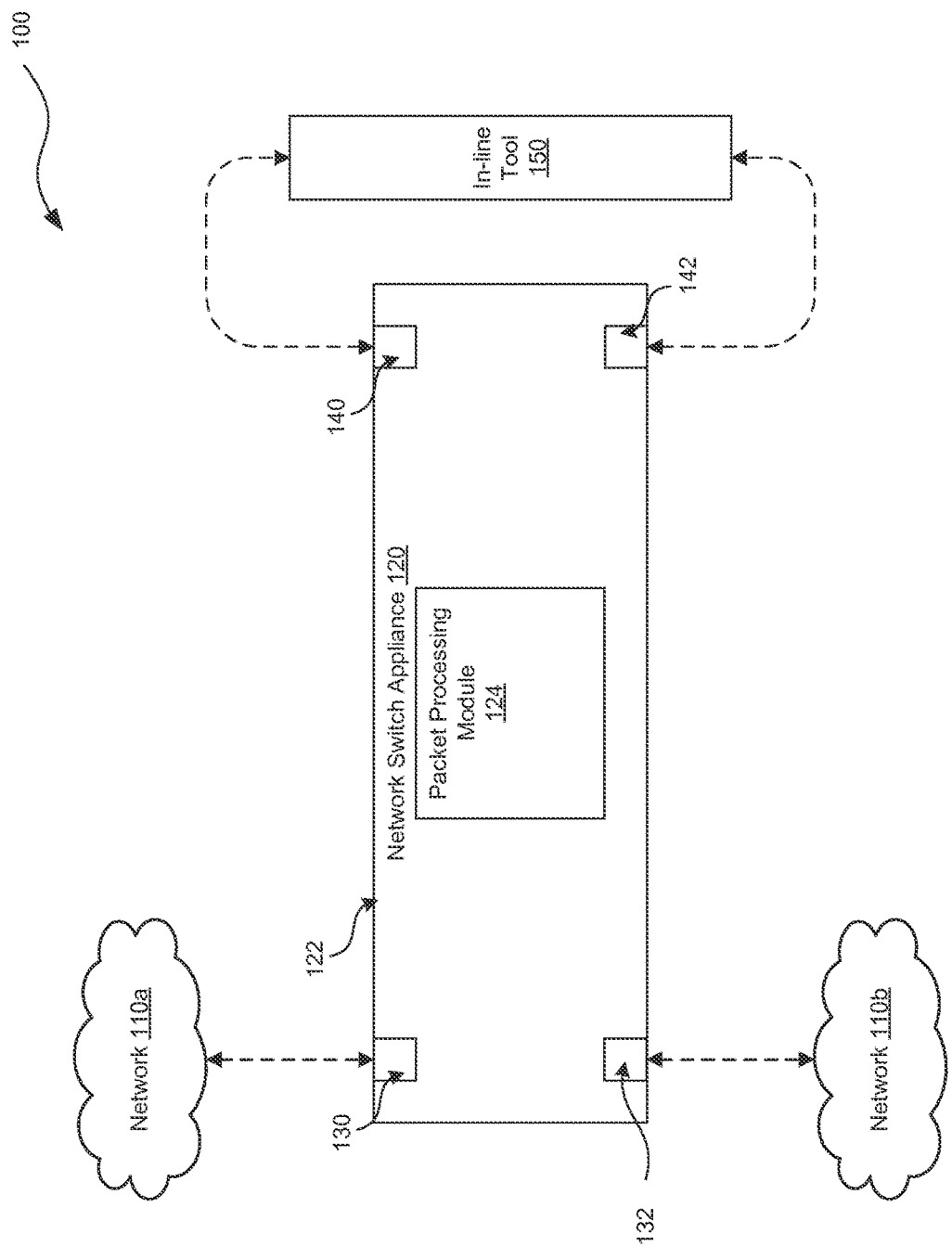
FIG. 1 shows an example system for monitoring the performance of an in-line tool.

Processing of packet data at an in-line tool inevitably introduces latency in the transmission of the packet data from a source node to a destination node on a computer network. The introduced latency can be caused by the time required to process packet data at the in-line tool and can vary based on the processing capabilities of the in-line tool and/or the overall processing load at the in-line tool. As used herein, the term "tool," may be used interchangeably with other terms such as "instrument" or "device." Without reliable monitoring and corrective actions, the latency introduced at an in-line tool can create a bottleneck that can impact overall network performance.

The measured latency in network traffic through an in-line tool can be an important indicator of the current and predicted performance capabilities or health of the in-line tool and current and predicted network traffic conditions. For example, increases in the measured latency at an in-line tool can indicate degraded processing capabilities at the in-line tool and/or a current or impending processing overload due to heavy network traffic. A network traffic bottleneck caused by an over-loaded in-line tool can be avoided by, in some embodiments, by re-routing network traffic temporarily over an alternative route to other in-line tools or to bypass in-line tool processing completely.

One method for measuring a latency in network traffic between points along a transmission path involves introducing heartbeat packets to the network traffic and tracking a time difference between transmitting the network heartbeat packet and receiving the heartbeat packet. For example, a timestamped address resolution packet (ARP) can be introduced to a stream of network traffic at a first point along a transmission path. The timestamped ARP is then received at a second point along the transmission patch and again timestamped. The difference between the transmission timestamp and the receipt timestamp provides a latency value that is indicative of the overall latency of the network traffic between the first point and the second point. While the use of heartbeat packets can be effective, it is not optimal in a network monitoring context. Heartbeat packets represent data added to the network traffic routed through an in-line tool. Although the heartbeat packet is typically removed before transmission to a destination node, its presence changes the nature of the network traffic processed by the in-line tool, thereby rendering any resulting latency values unreliable. Particularly in a network monitoring context, a heartbeat packet (e.g., an ARP) may be relatively innocuous in nature (i.e., recognizably benign) and therefore subject to less stringent processing by an in-line tool. Accordingly a latency value based on the processing time for a heartbeat packet may not be representative of the processing time for packets in the general network traffic.

Alternatively, the latency in network traffic can be measured without adding test packets to the network traffic. In such embodiments, the latency in the network traffic is instead based on directly measuring the latency through an in-line tool for packets originating from a source node and bound for a destination node. This involves receiving a packet from an in-line tool with knowledge of a time at which that packet was originally received from a source node or was transmitted to the in-line tool. In one embodiment, this is accomplished by adding a tag and a timestamp to a packet received from a source node before forwarding to the in-line tool. The packet is again received from the in-line tool after processing. The added tag allows the receiver to recognize the packet received from the in-line tool as the same as the packet received from the source node and add a second timestamp. The difference between the two timestamps indicates the processing latency of the in-line tool.

The addition of an identification tag to existing packets avoids the addition of heartbeat packets, however, the tag still represents added data and therefore may impact processing at the in-line tool and accordingly the reliability of any resulting latency values. In an alternative approach, latency is calculated without adding any data to the network traffic, by instead storing and comparing timestamps associated with packets received from a source node and routed through an in-line tool. In one embodiment, upon receiving a packet from a source node at a network switch appliance, a signature and a first timestamp associated with the packet are stored in memory at the network switch appliance. The packet is then forwarded to an in-line tool for processing and after processing, returned to the network switch appliance. The returned packet at the network switch applicant is recognized based on a comparison against the stored signature and a second timestamp based on the time of receipt is stored. The measured latency of that packet through the in-line tool is based on the difference between the first packet and the second packet.

The measured latency in network traffic through an in-line tool can then be used to make routing decisions to avoid overloading the in-line tool and creating a bottleneck. Further embodiments are described herein that adaptively guide network traffic based on the measured performance of an in-line tool.

Example System for in-Line Tool Performance Monitoring and Adaptive Packet Routing FIG. 1 shows an example system 100 for monitoring the performance of an in-line tool. As shown in FIG. 1, system 100 includes a network switch appliance 120 connected to networks 110a-b and an in-line tool 150. The network switch appliance 120 includes a first network port 130, a second network port 132, a first instrument port 140, and a second instrument port 142. The example network switch appliance 120 is shown in FIG. 1 as having two network ports and two instrument ports for clarity, however in other embodiments the network switch appliance can have more or fewer network and instrument ports. In some embodiments, network switch appliance 120 includes a housing 122 enclosing a packet processing module (also referred to herein as a "processing unit") 124. In such an embodiment, the network ports 130-132 and instrument ports 140-142 may be built into the housing 122. In other illustrated embodiments, network switch appliance 120 also includes other components, such as performance monitoring module 126 (see FIG. 2), or a routing logic module 128 (See FIG. 4A). In such embodiments, additional processing components such as performance monitoring module 126 and routing logic module 128 may be separate components or may be integrated as part of packet processing module 124. In some embodiments, network switch appliance includes physical layer transceiver circuitry (e.g. a Network PHY chip) (not shown) coupled to each of the respective ports 130-132 and 140-142. Network PHYs may be considered to be parts of the processing module 124 or may be considered to be components that are separate from the processing module 124. The PHY is configured to connect a link layer device to a physical medium such as an optical fiber, copper cable, etc. In other embodiments, instead of the PHY, the network switch appliance 120 includes an optical transceiver, or a SERDES, etc. The housing 122 allows the network switch appliance 120 to be carried, transported, sold, and/or operated as a single unit.

The ports 130, 132, 140, and 142 are shown in FIG. 1 in simplified form for clarity and illustrative purposes. In some embodiments, ports 130, 132, 140, and 142 are located at a periphery of the housing 122. In other embodiments, the ports 130, 132, 140, and 142 are located at other locations relative to the housing 122. Although two network ports 130, 132 are shown, in other embodiments, the network switch appliance 120 may include only one network port or more than two network ports. Also, although two instrument ports 140, 142 are shown, in other embodiments, the network switch appliance 120 may include only one instrument port, or more than two instrument ports. Further, in some embodiments ports 130, 132, 140, 142 shown in FIG. 1 represent a single physical ports. In other embodiments, ports 130, 132, 140, 142 shown in FIG. 1 represent virtual ports that may be combined as part of one or more physical ports. For example, network ports 130 and 132 may be part of a single physical port installed in the housing 122 of network switch appliance 120. Similarly, ports 130-132 and 140-142 may be aggregates of multiple physical ports through common switch fabric arrangements known as link aggregation or trunking. For example, each of the ports labeled 140 and 142 in FIG. 1 can represent a group of physical ports used as a single packet transmission channel through link aggregation.

During use, the first network port 130 of the network switch appliance 120 is communicatively coupled to a first node via network 110a, and the second network port 132 is communicatively coupled to a second node via network 110b. Network 110a and 110b may be separate networks or part of the same network. The network switch appliance 120 is configured to receive packets from the first and second nodes via the network ports 130, 132. As used herein, the node from which a packet originates is referred to as a "source node," and the node to which that packet is destined is referred to as a "destination node." The terms "source node" and destination node" are relative to a given packet. In other words, a particular node on computer network may operate as both a "source node" relative to packets it transmits and a "destination node" relative to packets it receives. Also, during use, the instrument ports 140, 142 of the network switch appliance 120 are communicatively coupled to one or more in-line tools 150. The one or more in-line tools 150 may be directly coupled to the network switch appliance 120, or communicatively coupled to the network switch appliance 120 through a network (e.g., Internet). Tunneling may be applied where in-line tools 150 are communicatively coupled to the network switch appliance 120 via a network such as the Internet. In an embodiment, network traffic transmitted from the network switch appliance 120 to an in-line tool is encapsulated into an IP tunnel envelope. The network traffic is then de-encapsulated at the in-line tool. Such an arrangement may require that the in-line tool 150 receive tunneling arrangements to facilitate de-encapsulation. In another embodiment, an in-line tool 150 may be communicatively coupled to the network switch appliance 120 via a stacking link of one or more other network switch appliances. For example, a network switch appliance 120 including a processing component such as in-line traffic broker module 126 may be interconnected using stacking links with one or more other physical network switch appliances. The interconnected network switch appliance 120 and one or more other network switch appliances act as single switch in such a configuration. Therefore an in-line tool 150 may be directly connected to one or more of the other network switch appliances. In some cases, the network switch appliance 120 is provided as a single unit that allows the appliance 120 to be deployed at a single point along a communication path. In the illustrated embodiments, the packet processing module 124 is configured to receive packets from one or more source nodes via the network ports 130, 132 communicatively coupled to a network 110a-b, and process the packets in accordance with the schemes described herein. For example, the packet processing module 124 may pass packets received from one or more source nodes to one or more in-line tools 150 that are connected to respective instrument port(s) 140, 142. Similarly, packet processing module 124 may receive packets from an in-line tool 150 after processing and forward to the destination node via a network port 130, 132 communicative coupled to a network 110a-b.

In some embodiments, the processing unit 124 is configured to operate as a switch module or packet switch that provides packet transmission in accordance with a pre-determined and/or programmable transmission scheme. In some embodiments, the packet switch may be user-configurable such that packets may be transmitted in a one-to-one configuration (i.e., from one network port to an instrument port). As used in this specification, the term "instrument port" refers to any port that is configured to transmit packets to an instrument or device of some type for packet processing (e.g. an in-line tool 150). The instrument may be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc. The instrument may also be a pass through device that can receive packets originating from a source node, and transmit the packets back to the appliance 120 after the packets have been processed where the packets are then forwarded to a destination node. An example pass-through device is an intrusion prevention system. As shown in FIG. 1, in-line tool 150 is a pass-through device meaning that it is configured to be in-line with the transmission path between a source node and a destination node. The terms "instrument" or "tools" are not limited to discrete physical devices. For example, an in-line tool may be virtualized through a combination of software and/or hardware and may, in some embodiments, be integrated (partially or completely) into the network switch appliance 120.

In some embodiments, the packet switch is configured such that the packets are transmitted in a one-to-many configuration (i.e., from one network port to multiple instrument ports). In other embodiments, the packet switch is configured such that the packets are transmitted in a many-to-many configuration (i.e., from multiple network ports to multiple instrument ports). In further embodiments, the packet switch is configured such that the packets are transmitted in a many-to-one configuration (i.e., from multiple network ports to one instrument port). In some embodiments, the one-to-one, one-to-many, many-to-many, and many-to-one configurations are all available for allowing a user to selectively configure the network switch appliance 120 so that the packets (or certain types of packets) are routed according to any one of these configurations. In some embodiments, the packet movement configuration is predetermined such that when the packet switch appliance 120 receives the packets, the packet switch appliance 120 will automatically forward the packets to the ports based on the predetermined packet movement configuration (e.g., one-to-one, one-to-many, many-to-many, and many-to-one) without the need to analyze the packets (e.g., without the need to examine the header, determine the type of packets, etc.). Examples of packet switch that may be used to implement features described herein include any of the commercially available network switch devices, such as GigaVUE™, produced by Gigamon, Inc.

In some embodiments, the packet switch implemented using the packet processing module 124 may have the functionalities of a conventional packet switch except that it provides visibility into various parts of a network. Thus, embodiments of the packet switch may operate like a conventional managed packet switch, but providing packet monitoring function. This is accomplished by configuring the packet switch to operate as a circuit switch under certain circumstances. In some embodiments, the configuring of the managed packet switch may be performed by utilizing a CPU interface of the switch to modify appropriate registers in the switch to allow for the desired operation.

It should be noted that the packet switch that may be used with the network switch appliance 120 is not limited to the examples described above, and that other packet switches with different configurations may be used as well. Also, in any of the embodiments described herein, the processing unit (i.e., packet processing module 124, performance monitoring module 126, and/or routing logic module 128) implementing the packet switch may be any integrated circuit, such as a processor (e.g., a general purpose processor, a network processor, an ASIC processor, a FPGA processor, etc.). In some embodiments, the processing unit may be a processor, such as a field processor. In other embodiments, the processing unit may be a network card. Also, in some embodiments, the processing unit may include ternary content-addressable memory (TCAM). By means of non-limiting examples, the processing unit may be a type StrataXGS family device, manufactured by Broadcom, at Irvine, Calif. The processing unit may be configured to perform various packet processing functions, included but not limited to packet filtering, packet routing, packet switching, packet mirroring, packet aggregation, etc.

In-Line Tool Performance Monitoring

Figure 2:
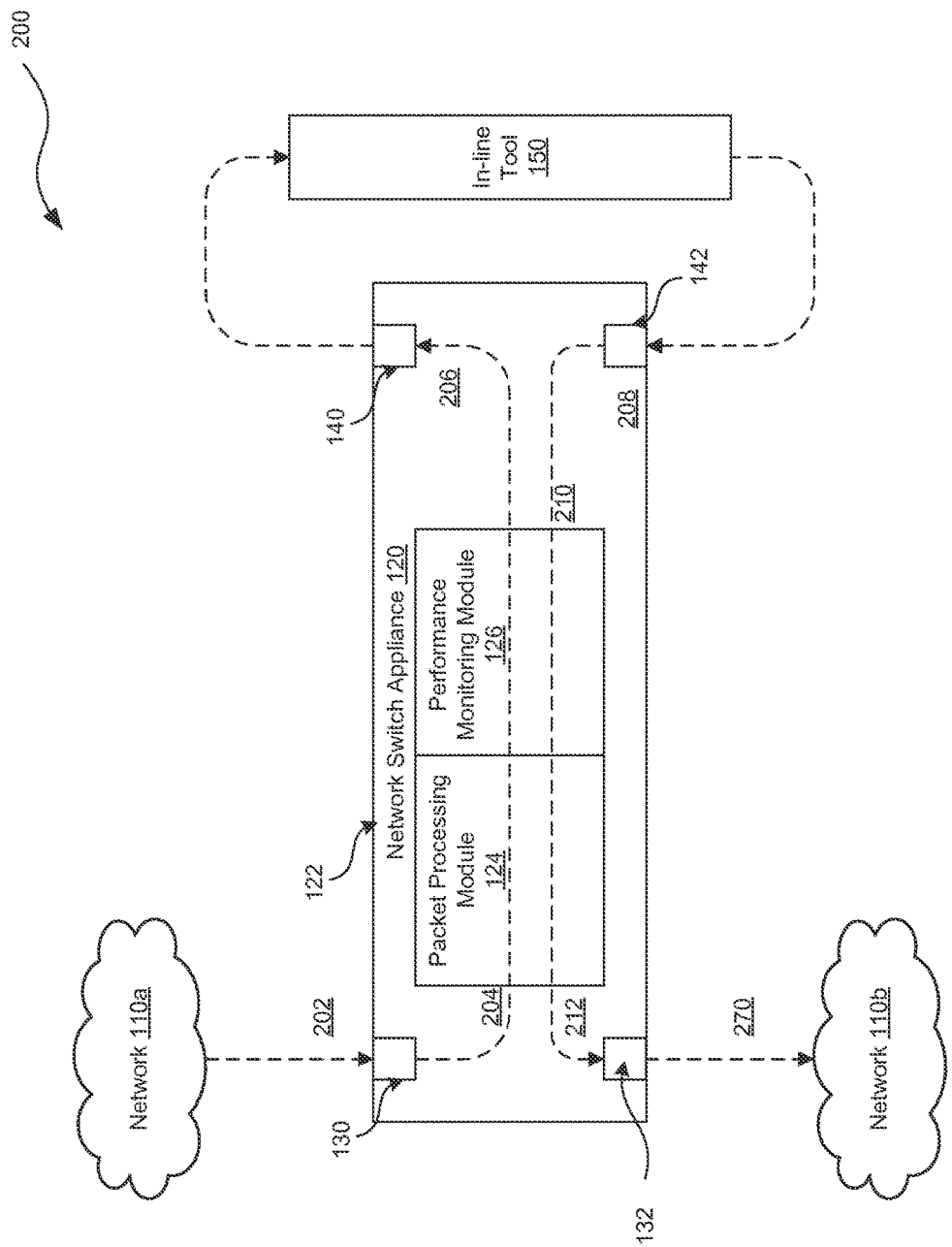
FIG. 2 shows a diagram of an example packet flow through the system shown in FIG. 1 for monitoring the performance of an in-line tool.

FIG. 2 shows an example packet flow diagram 200 for monitoring the performance of an in-line tool, according to some embodiments. The packet flow diagram 200 describes an example transmission path for a packet through a system for monitoring the performance of an in-line tool. The system shown in FIG. 2 is similar to system 100 shown in FIG. 1.

As shown in FIG. 2, at step 202, a packet is received, via network 110a, from a source node at a network port 130 of network switch appliance 120. The received packet is then forwarded at step 206 to an in-line tool 150 via instrument port 140. However, prior to forwarding the packet to the in-line tool, the packet is processed and information regarding the packet is stored at step 204 according to processes performed by a packet processing module 124 and/or a performance monitoring module 126. As previously described, packet processing module 124 and performance monitoring module 126 may be separate components or part of a single integrated component. For the purposes of clarity, an example embodiment is described in which the performance monitoring module 126 performs the processes, in alternative embodiments, any computer processing components (within or outside of network switch appliance 120) may be implemented to perform similar processes.

At step 204, upon receiving the packet at network port 130, an entry is stored in a data structure that includes data associated with the received packet. At a most basic level, all is needed is a signature or some sort to of identifier associated with the packet so that the same packet can be recognized after it has passed through the in-line tool 150 and a timestamp upon which to base a latency measurement. As explained earlier, in preferred embodiments, no data is added to the network traffic so instead of adding a tag to the packet, data is stored in the data structure based on the contents of the packet. This is generally referred to herein as a "packet signature." In some embodiments the packet signature can be universally unique, meaning that any received packet will have a different signature no matter how many packets are received. However, a universally unique signature may not be needed in all implementations, and instead a locally unique (i.e. temporally or based on the network context) signature may suffice. In some embodiments the packet signature includes an identifier associated with the source node from which the packet originated and a payload data indicator based on the contents of the payload data in the packet that provides for some level of identification. In certain localized contexts, the combination of a source node identifier and a payload data indicator is sufficient to uniquely identify a packet. The source node identifier can be gathered from a header associated with the packet and may include an address associated with the source node such as an IP address or a media access control (MAC) address. The payload data indicator may be based any type of data conversion, hash, or checksum that can be used to determine if two data sets match. For example, the payload data indicator may be based on cyclic redundancy check (CRC) value. Although typically used to detect accidental changes in the payload data of a packet, a CRC value may be used in this context to help identify the packet after it has passed through the in-line tool 150. In addition to the packet signature, a first timestamp is recorded and associated with the packet signature in the data structure. In some embodiments, the first timestamp is based on a time of receipt of the packet from the source node at the network port 130. However, because the timestamp will be used to calculate a latency in processing at the in-line tool 150, it is preferable to base the timestamp on a time closest to that processing, for example a time at which the packet is forwarded to the in-line tool 150 via instrument port 140 (see step 206 in FIG. 2).

Figure 3A:
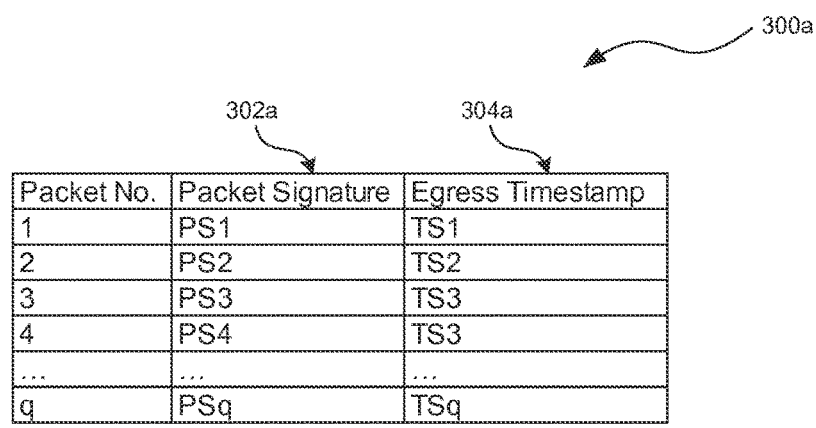
FIG. 3A shows a first example data structure for storing packet signatures and timestamps for packets received from a source node.

The packet signature and timestamp can be stored using different types of data structures. FIG. 3A shows a first example data structure 300a for storing the packet signature and timestamp for packets received from a source node. As shown in FIG. 3A, the data structure can be a simple relational data structure, illustrated here as a relational table of rows and columns. With data structure 300a, as a packet is received an entry is created that includes at least packet signature (as shown at column 302a) and an "egress" or "sent" timestamp (as shown at column 304a). The data structure can be populated with data associated with q number of received packets.

Figure 3B:
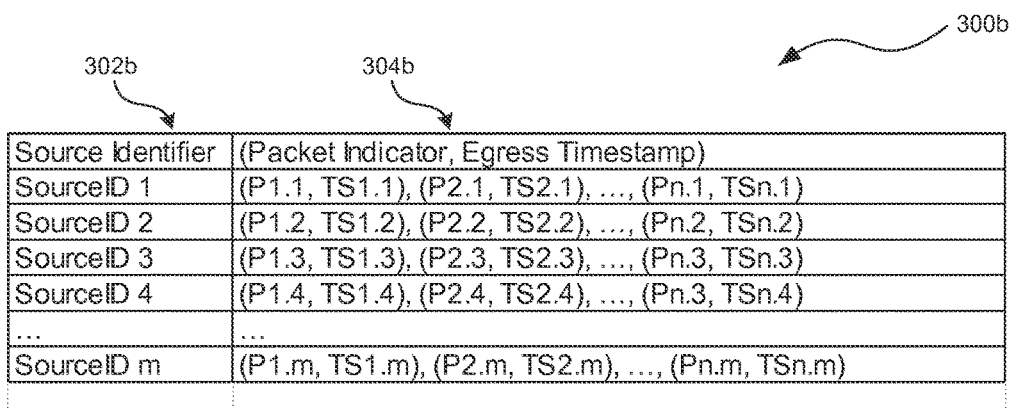
FIG. 3B shows a second example data structure for storing packet signatures and timestamps for packets received from a source node.

As described earlier, the data structure is used to perform a lookup upon receiving a packet back from the in-line tool and comparing timestamps. Accordingly, with this type of data structure a lookup may be processor and/or time intensive because the lookup will necessarily involve comparing the signature associated with a received packet to each entry in the data structure until a match is found. FIG. 3B shows a second example data structure 300b that alleviates this issue. Example data structure 300b is organized based on key values 302b and associated values 304b with those key values. Here, as a packet is received an entry is created in data structure 300b. Recall that in some embodiments, a signature associated with the received packet includes a source node identifier and a payload data indicator. In data structure 300b, the source node identifier is used as a key value. Data structure 300b includes rows associated with packets received from sources 1 though m. In this example, if a received packet is from a source node not already included in the data structure, a new row is created with the source node identifier for the source node form which the packet was received. The packet identifier and egress timestamp are then stored in relation to the source node identifier. For example, upon receiving a first packet from source node 1, an entry is created with sourceID 1 as the key value and is associated with at least a packet indicator P1.1 (e.g. a CRC value) and timestamp TS1.1 for the received packet. If, however, packets have already been received from source node 1, a new set of values is entered and associated with exiting sourceID 1, for example packet indicator P2.1 and timestamp TS2.1. Accordingly, each source node identifier can be associated as a key value with values for a plurality of packets received from the source node associated with that source node identifier. In other words, Source ID m can be associated with values (P1.m, TS1.m) through (Pn.m, TSn.m) for n received packets. The associated values, shown here as value pairs (Pn.m, TSn.m) can be removed from the data structure based on age-based cleanup routines and/or when the entries are used for a latency calculation.

The data structure 300b shown in FIG. 3B facilitates more efficient lookup because upon receiving a packet from an in-line tool, the performance monitoring module 126 can narrow down the lookup based on the source node identifier associated with the received packet. The lookup will merely involve determining the source node identifier associated with the packet received from the in-line tool based on that packet's signature, identifying a key value stored in the data structure matching the source node identifier associated with the packet received from the in-line tool; and identifying a payload data indicator matching the payload data indicator associated with the packet received from the in-line tool. In other words instead of having to potentially review q number of entries for q number of packets received via a network port, the lookup will need only review n number of entries from n number of packets received from a particular source node via a network port.

In any data structure, entries can be removed based on age, max number of entries, and/or as they are used for latency calculations. In some embodiments, the data structure is configured to hold entries for at least the maximum number of packets to simultaneously transition trough the in-line tool. Although this is highly dependent on the type of tool and the type of processing at the tool, in a typical configuration, around 50 milliseconds of network traffic is likely sufficient. Further, a system in accordance with the present teachings, can be configured to measure the latency of each packet transmitted through the in-line tool 150 or a subset of the packets. For example, in some embodiments, a set percentage of packets trigger entries into the data structure, in other embodiments, packets that match a specified criteria trigger entries into the data structure. For example, a user can configure the system to measure the latency in processing at an in-line tool for packets belonging to an audio stream, packets sent from a particular source node and/or destined for a particular destination node, packets of a particular length, etc.

Returning to FIG. 2, after a packet is processed at the in-line tool 150, it is received at step 208 at instrument port 142. Upon receiving a packet from an in-line tool 150, the performance monitoring module 126 can at step 210 timestamp the received packet with a second timestamp and identify the packet received from the in-line tool 150 as the same as the packet transmitted to the in-line tool based on a lookup in the data structure, or in other words a comparison of the signature with the entry in the data structure. Once the packet received from the in-line tool 150 is identified as the same as a packet transmitted to the in-line tool a latency through the in-line tool can be calculated based on the difference between the first timestamp and the second timestamp.

After calculating the latency of the packet through the in-line tool, the packet is forwarded at step 212 to a network port 132 for transmission to the destination node via network 110*b*, as shown in FIG. 2.

Adaptive Packet Routing

A measured latency in network traffic through an in-line tool is an important indicator of the current performance capabilities or health of the in-line tool. If the purpose of the in-line tool is to monitor network traffic, it is of course preferable to monitor all the traffic via the in-line tool. However, assuming limited processing capabilities and network throughput, in certain situations monitoring the all of the traffic may impact overall network performance. Accordingly, the network traffic may be redirected, if the measured latency satisfies a specified criterion, to prevent a bottle neck situation at an in-line tool from affecting overall network performance. In some embodiments, redirecting network traffic may simply include bypassing the in-line tool and forwarding the traffic to the intended destination node. In other embodiments, where multiple in-line tools are available, redirecting the network traffic may include load-balancing across the multiple in-line tools. In other words, routing network traffic to one or more other in-line tools that are not experiencing performance issues.

Figure 4A:
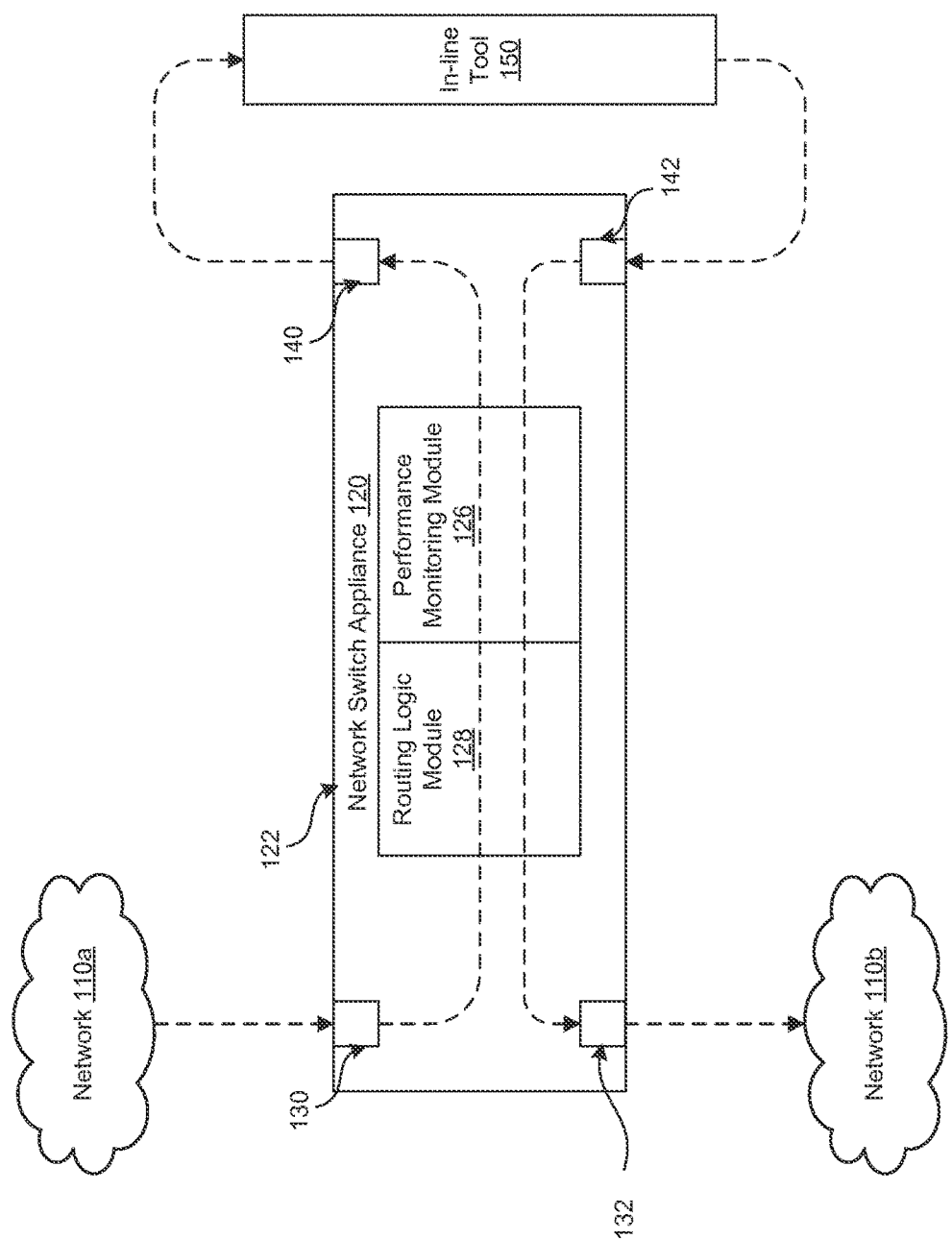
FIG. 4A shows a an example route for network traffic through an in-line tool.
Figure 4B:
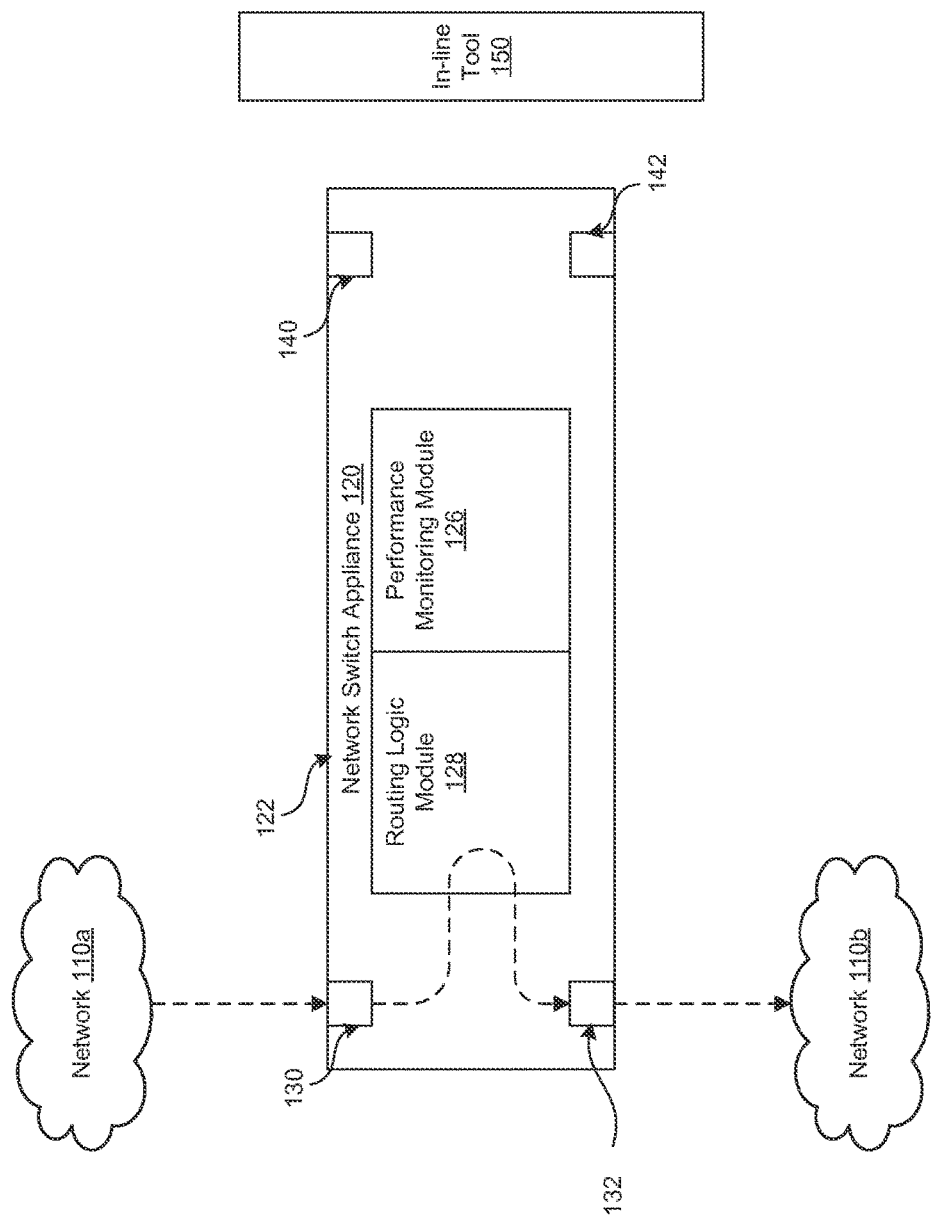
FIG. 4B shows an example forwarding route for network traffic that bypasses an in-line tool.

FIGS. 4A and 4B illustrate an example in-line bypass response to a measured latency at an in-line tool. The system shown in FIGS. 4A to 4B is the same as the system 100 shown in FIG. 1 except that the packet processing module 124 of system 100 in FIG. 1 is represented here as a routing logic module 128 and a performance monitoring module 126. As explained earlier these modular divisions are included to provide clarity, but are not intended to be limiting. The processes described herein can be performed by any processing means located within or outside of network switch appliance 120. The network traffic route through the in-line tool 150 is illustrated by the dotted line originating from a source node via network 110*a*, entering the network switch appliance at network port 130, forwarding to the instrument port 140 for transmission to the in-line tool 150, receipt from the in-line tool 150 at instrument port 142 and forwarding to network port 132 for transmission to the destination node via network 110*b*.

As shown in FIG. 4B, if the measured latency values at the in-line tool 150 (e.g. as measured by performance monitoring module 126) meet a specified criterion, the routing logic module 128 can redirect the network traffic to bypass the in-line tool 150 and continue on to the destination node via network 110*b*. The bypass path shown in FIG. 4B is simplified for clarity. Any port forwarding arrangement may be used that bypasses the in-line tool to route traffic to the intended destination node.

Figure 5:
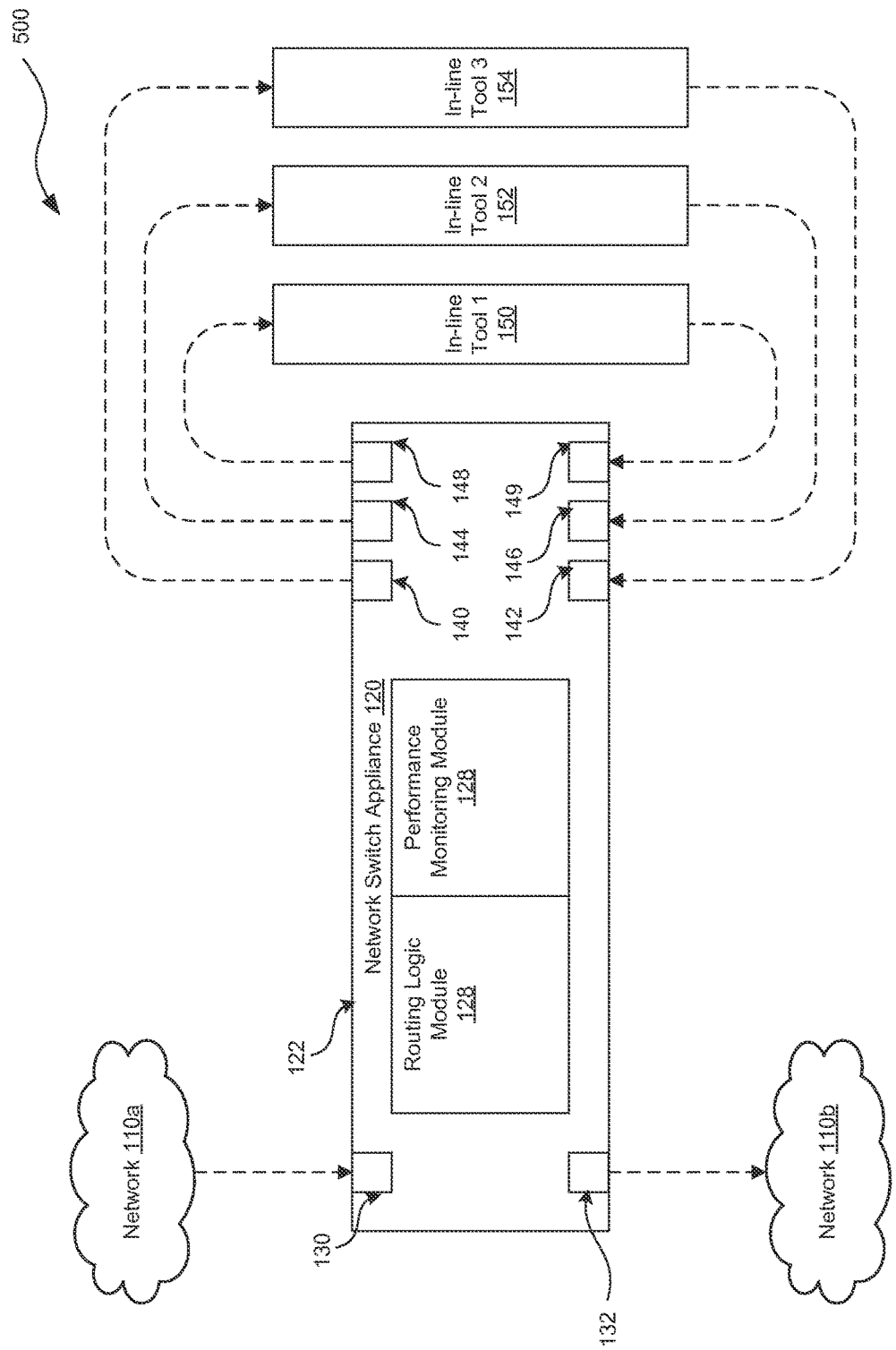
FIG. 5 illustrates an example load balancing response to a measured latency at an in-line tool.

FIG. 5 illustrates an example load balancing response to a measured latency at an in-line tool. Load balancing necessarily involves monitoring an indicator of utilization and making resource allocation decisions based on that utilization. Latency at an in-line tool is an effective indicator of utilization. The system 500 shown in FIG. 5 is similar to system 100 shown in FIG. 1, except that system 500 includes multiple tools 150, 152, and 154. The network switch appliance of system 500 communicates with the multiple tools via multiple network ports 140, 142, 144, 146, 148, and 149. Here, instead of bypassing the tools to transmit network traffic directly on to the destination node via network 110*b*, the routing logic module can make decisions on which tool or combination of tools through which to route network traffic based on measured latency values (e.g. as measured by performance monitoring module 128).

In some embodiments, network traffic is redirected on a session basis instead of a per-packet basis. In other words, instead of making an individual routing decision for each packet as it is received from a source node, a particular session in the network traffic may be identified and the traffic belonging to that session routed according to a redirection decision. The term "session" is generally understood to mean any grouping of network traffic that fits a specified criterion. For example, traffic originating from a particular source node and/or received during a given time period may comprise a network session. In some embodiments sessions are identified as network traffic is received at the network switch appliance 120. To track identified sessions a data structure (e.g. a table) is created and stored that associates packet matching criteria to number of different identified sessions and a routing decision for that particular session. In some embodiments the packet matching criteria defining a session can include a 5-Tuple, i.e. a source IP address, a source port, a destination IP address, a destination port, and the transmission protocol, although any data associated with the received packets can be used to define a session. As packets are received (e.g. at network port 130), they are matched to one of the existing sessions contained in the data structure or a new session is identified and entered into the data structure. The received packets are then redirected according to the routing decision associated with the session that they belong to. As an illustrative example, consider a scenario in which a new session A is identified based on incoming network traffic. Based on latency values measured at in-line tools 150, 152, and 154, a decision is made to route traffic belonging to session A through in-line tool 152. This decision can also be based on a priority level assigned to session A traffic. Lower priority traffic is more likely to bypass any processing through in-line tools 150, 152, or 154, than to be directed to an alternative in-line tool. Therefore, if session A is deemed low priority it may be redirected to bypass all of the in-line tools and continue to the destination node.

In some embodiments, the specified criteria upon which routing decisions are based are set by a user. For example, a user can define one or more threshold latency values and priority levels for certain network traffic that dictate when to redirect that network traffic. In other embodiments, the specified criteria may be based on the tracked performance of the in-line tools. For example, in an embodiment, the performance monitoring module 128 measuring a latency for a plurality packets of the network traffic through the in-line tool 150 over a time period. Based on these measurements, the performance monitoring module 128 can calculate one or more a threshold latency values. For example, threshold vales may include, but are not limited to a minimum, maximum, or average latency of the network traffic through the in-line tool over the time period. The specified criteria on which redirection decisions are made is then based on the calculated one or more threshold latency values. For example, if the measured latency of an individual packet exceeds (e.g. by a specified margin) the average latency over a given time period, it may indicate that processing is slowing down at the in-line tool and that redirection is necessary.

In some embodiments, the specified criterion is further based on a priority level of the network traffic. For example, a user may define traffic matching a first set of characteristics (e.g. traffic originating outside an enterprise network) as a priority over traffic matching a second set of characteristics (e.g. internal network traffic). Accordingly the latency values at which point the higher priority traffic is redirected may differ from the latency values at which point the lower priority traffic is routed. Similarly, the measured latency at an in-line tool can indicate a stress condition at the in-line tool. The specified criterion may be configured such that high priority traffic is redirected to another in-line tool while low priority traffic is redirected to bypass all of the tools regardless of their condition so as to reserve processing resources for the higher priority traffic.

In some embodiments, characteristics of a given in-line tool can be defined based on historical performance measurements. The specified criteria upon which routing decisions are made may further be based on such tool characteristics. To do so, in some embodiments, the performance monitoring module 128 measures a latency of a plurality of packets of network traffic through the in-line tool over a time period, defines a characteristic associated with the in-line tool based on the measured latency of the plurality of packets, and adjusts the specified criterion based on the characteristic associated with the in-line tool. Example characteristics include, but are not limited to, statistical measures (e.g. minimum, maximum, average, etc.) of latency when processing a particular type of network traffic, statistical measures (e.g. minimum, maximum, average, etc.) of latency during particular time periods, and statistical measures (e g minimum, maximum, average, etc.) of rate of change in measured latency under particular network traffic conditions. By taking into account the performance characteristics of a given in-line tool, a routing logic module 128 can more effectively make routing decisions that maximize traffic monitoring while minimizing impact on overall network performance.

The above described methods for adaptive network traffic routing are based on latency measurements without adding data to the network traffic. However, as discussed previously, latency can be measured in a number of different ways. For example, network traffic latency through an in-line tool can be measured by adding heartbeat packets to the data stream or by appending ID tags and/or timestamps to the data packets making up the network traffic. The described methods for adaptive network traffic routing may similarly be applied using such alternative methods for measuring latency. Further, the measured latency of packets through an in-line tool is not the sole indicator of processing performance at the in-line tool. The described methods for adaptive network traffic routing may similarly be applied using alternative performance metrics. For example, packet routing decisions may be based on signals actively sent by an in-line tool that indicate its current processing capabilities and load.

Example Deployment in a Network Environment

Figure 6:
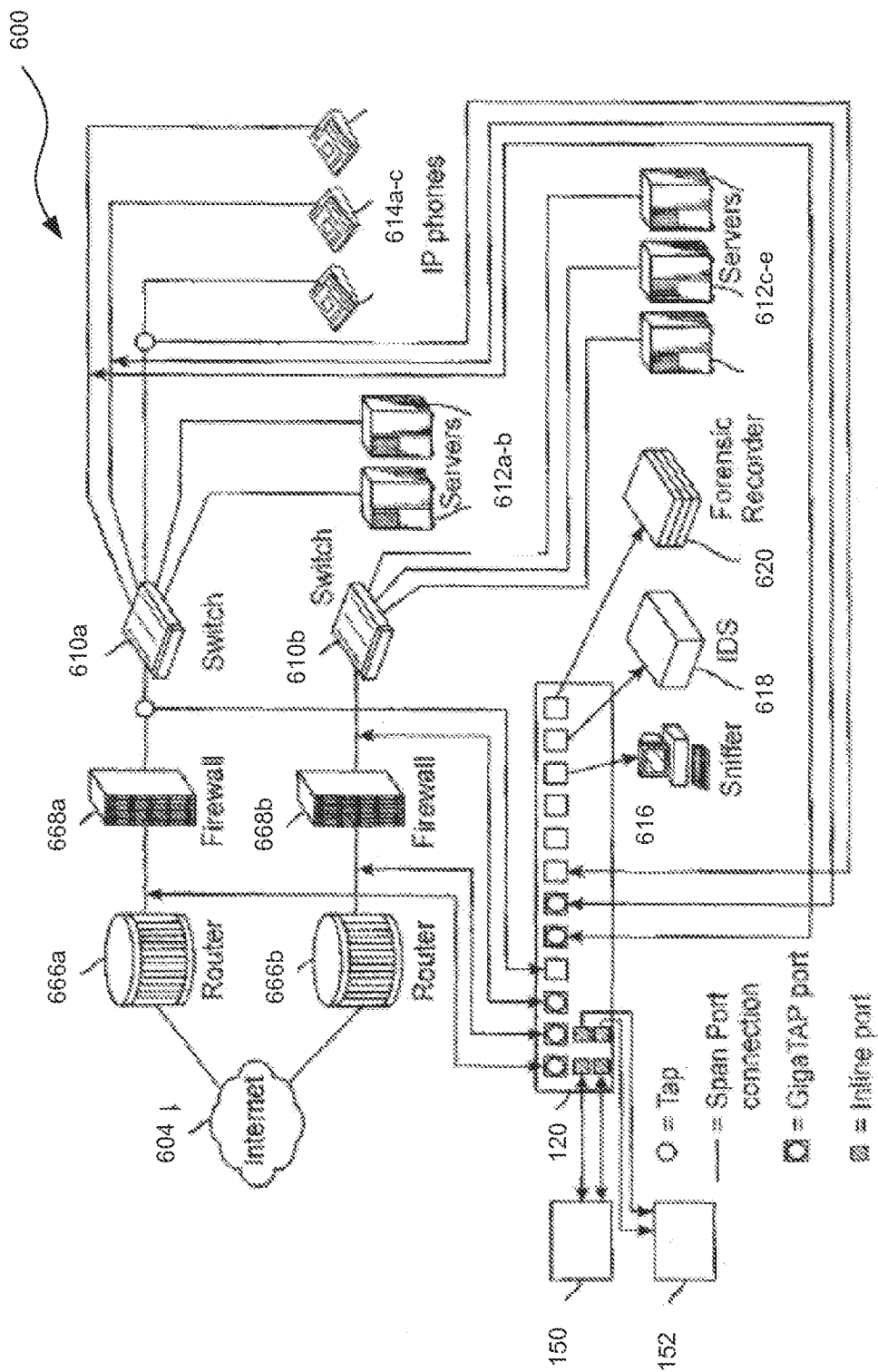
FIG. 6 shows an example deployment of a network switch appliance in a network environment.

FIG. 6 shows the deployment of the network switch appliance 120 in a network environment 600 in accordance with some embodiments. The Internet 604 is coupled via routers 666*a-b* and firewalls 668*a-b* to two switches 610*a* and 610*b*. Switch 610*a* is coupled to servers 612*a-b* and IP phones 614*a-c*. Switch 610*b* is coupled to servers 612*c-e*. A sniffer 616, an IDS 618 and a forensic recorder 620 (collectively, "non-pass through instruments") are coupled to the network switch appliance 120. As illustrated in FIG. 6, there is a reduction on the number of non-pass through instruments in this deployment as compared to a conventional configuration (in which there may be one or more non-pass through instruments between router 666*a* and firewall 668*a*, one or more non-pass through instruments between firewall 668*a* and switch 610*a*, one or more non-pass through instruments between router 666*b* and firewall 668*b*, and firewall 668*b* and switch 610*b*) because the same non-pass through instruments can now access information anywhere in the network environment 600 through the appliance 120. The user has complete flexibility to channel whatever traffic to whatever instrument or groups of non-pass through instruments, using the any-to-any, any-to-many and many-to-one capability of the system in accordance with the different embodiments described herein. For example, all the conversations of the IP phones 614*a-c* can be easily configured to be sent to an IDS 618. It is also possible that traffic inside a particular IP phone 614*a-c* connection can be sent to a sniffer 616, and Intrusion Detection System 618 and a forensic recorder 620 simultaneously via the one-to-many function.

In some embodiments, when using the appliance 120, one or more non-pass through instruments (such as IDS, sniffer, forensic recorder, etc.) may be connected to instrument port(s), and one or more pass through instruments 150, 152 (e.g., IPS) may be connected to other instrument port(s) (e.g., in-line port(s)). Such configuration allows non-pass through instrument(s) and pass through instrument(s) to simultaneously monitor the network traffic. Each non-pass through instrument is in listening mode (i.e., it receives packets intended to be communicated between two nodes), and each pass through instrument is in pass-thru mode (i.e., it receives packets intended to be communicated between two nodes, processes them, and then pass the packets downstream towards the intended recipient node). In some cases, by having both an IDS and an IPS connected to the appliance 120, the appliance 120 can compare whether the IDS or the IPS sees more threats, and/or can have a redundant protection such that if the IPS misses any threat, the IDS may pick it up.

Example Computer System Architecture

Figure 7:
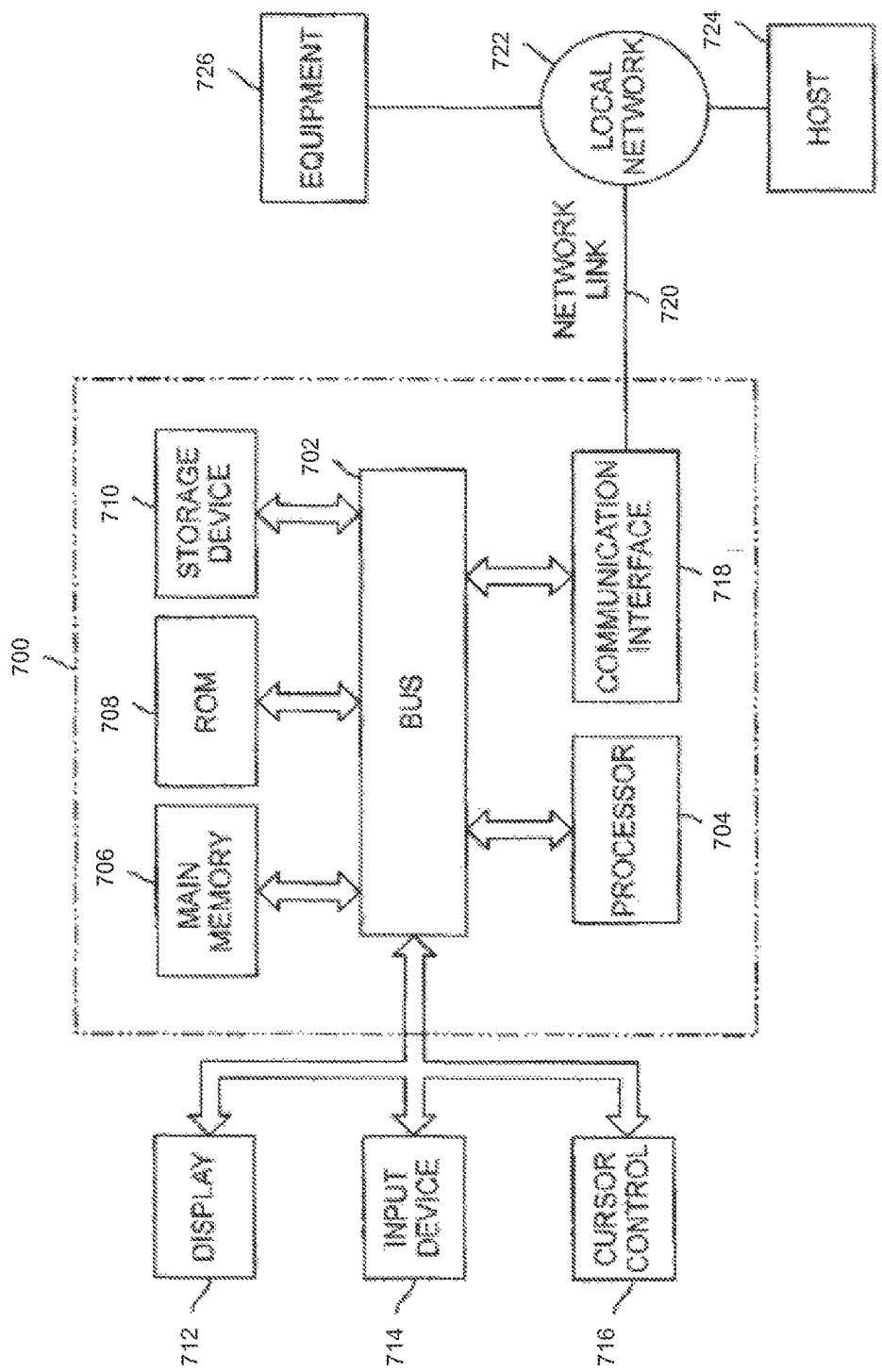
FIG. 7 is a block diagram that illustrates an embodiment of an example computer system upon which embodiments described herein may be implemented.

FIG. 7 is a block diagram that illustrates an embodiment of a computer system 700 upon which embodiments described herein may be implemented. Computer system 700 includes a bus 702 or other communication mechanism for communicating information, and a processor 704 coupled with the bus 702 for processing information. The processor 704 may be used to perform various functions described herein. For example, in some embodiments, the processor 704 may receive input from a user for configuring a network component (e.g., the network switch appliance 120).

The computer system 700 also includes a main memory 706, such as a random access memory (RAM) or other dynamic storage device, coupled to the bus 702 for storing information and instructions to be executed by the processor 704. The main memory 706 also may be used for storing temporary variables or other intermediate information during execution of instructions to be executed by the processor 704. The computer system 700 further includes a read only memory (ROM) 708 or other static storage device coupled to the bus 702 for storing static information and instructions for the processor 704. A data storage device 710, such as a magnetic disk or optical disk, is provided and coupled to the bus 702 for storing information and instructions.

The computer system 700 may be coupled via the bus 702 to a display 712, such as a liquid crystal display (LCD) or light emitting diode (LED) display, for displaying information to a user. An input device 714, including alphanumeric and other keys, is coupled to the bus 702 for communicating information and command selections to processor 704. Another type of user input device is cursor control 716, such as a mouse, a trackball, touch screen display, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The computer system 700 may be used for performing various functions in accordance with the embodiments described herein. According to one embodiment, such use is provided by computer system 700 in response to processor 704 executing one or more sequences of one or more instructions contained in the main memory 706. Such instructions may be read into the main memory 706 from another computer-readable medium, such as storage device 710. Execution of the sequences of instructions contained in the main memory 706 causes the processor 704 to perform the process steps described herein. One or more processors in a multi-processing arrangement may also be employed to execute the sequences of instructions contained in the main memory 706. In alternative embodiments, hard-wired circuitry may be used in place of or in combination with software instructions to implement features of the embodiments described herein. Thus, embodiments described herein are not limited to any specific combination of hardware circuitry and software.

The term "computer-readable medium" as used herein refers to any medium that participates in providing instructions to the processor 704 for execution. Such a medium may take many forms, including but not limited to, non-volatile media, volatile media, and transmission media. Non-volatile media includes, for example, optical or magnetic disks, such as the storage device 710. A non-volatile medium may be considered to be an example of a non-transitory medium. Volatile media includes dynamic memory, such as the main memory 706. A volatile medium may be considered to be another example of a non-transitory medium. Transmission media includes coaxial cables, copper wire and fiber optics, including the wires that comprise the bus 702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 704 for execution. For example, the instructions may initially be carried on a magnetic disk of a remote computer. The remote computer can load the instructions into its dynamic memory and send the instructions over a telephone line using a modem. A modem local to the computer system 700 can receive the data on the telephone line and use an infrared transmitter to convert the data to an infrared signal. An infrared detector coupled to the bus 702 can receive the data carried in the infrared signal and place the data on the bus 702. The bus 702 carries the data to the main memory 706, from which the processor 704 retrieves and executes the instructions. The instructions received by the main memory 706 may optionally be stored on the storage device 710 either before or after execution by the processor 1204.

The computer system 700 also includes a communication interface 718 coupled to the bus 702. The communication interface 718 can include one or more ports to couple computer system 700 with one or more other devices over one or more point-to-point links, local area networks (LANs), wide area networks (WANs), the global Internet, virtual private networks (VPNs) implemented over a public network, or the like. For example, as shown in FIG. 7, communication interface 718 provides a two-way data communication coupling to a network link 720 that is connected to a local network 722. For example, the communication interface 718 may be an integrated services digital network (ISDN) card or a modem to provide a data communication connection to a corresponding type of telephone line. As another example, the communication interface 718 may be a local area network (LAN) card to provide a data communication connection to a compatible LAN. Wireless links may also be implemented. In any such implementation, the communication interface 718 sends and receives electrical, electromagnetic or optical signals that carry data streams representing various types of information.

The network link 720 typically provides data communication through one or more networks to other devices. For example, the network link 720 may provide a connection through local network 722 to a host computer 724 or to equipment 726 such as a radiation beam source or a switch operatively coupled to a radiation beam source. The data streams transported over the network link 720 can comprise electrical, electromagnetic or optical signals. The signals through the various networks and the signals on the network link 720 and through the communication interface 718, which carry data to and from the computer system 700, are exemplary forms of carrier waves transporting the information. The computer system 700 can send messages and receive data, including program code, through the network(s), the network link 720, and the communication interface 718.

It should be noted that when a "packet" is described in this application, the term may refer to the original packet that is transmitted from a node, or a copy of it.

Although particular embodiments have been shown and described, they are not intended to limit the invention except as recited in the appended claims. Changes and modifications may be made without departing from the spirit and scope of the claimed invention. The specification and drawings are, accordingly, to be regarded in an illustrative rather than restrictive sense. The claimed invention covers alternatives, modifications, and equivalents, as defined by the claims.

What is claimed is:

1. A method comprising:
   receiving a first packet, via a network port of a network switch appliance, from a source node on a computer network, the first packet destined for a destination node on the computer network;
   forwarding the first packet, by the network switch appliance, to an in-line tool for processing via a first route;
   storing, by the network switch appliance, information associated with the first packet as an entry in a key-value data structure, the entry including:
      a source node identifier associated with the source node as a key; and
      a payload data identifier and first timestamp as values associated with the key, the first timestamp based on a time of forwarding the first packet to the first packet to the in-line tool;
   receiving the first packet, by the network switch appliance, from the in-line tool after the processing;
   identifying, by the network switch appliance, the first packet received from the in-line tool as the same first packet forwarded to the in-line tool based on the entry in the key-value data structure; and
   measuring, by a processor in the network switch appliance, a latency in network traffic through the in-line tool based on a difference between the first timestamp and a second timestamp, the second timestamp based on a time of receiving the first packet from the in-line tool.

2. The method of claim 1, wherein the source node identifier is a media access control (MAC) address associated with the source node.

3. The method of claim 1, wherein the payload data identifier is a computed cyclic redundancy check (CRC) value based on the payload data in the first packet.

4. The method of claim 1, wherein the key-value data structure includes information associated with a plurality of packets received from the source node and other source nodes on the computer network.

5. The method of claim 1, wherein the key value is associated with values for a plurality of packets received from the source node.

6. The method of claim 1, wherein the identifying includes: determining the source node identifier associated with the first packet received from the in-line tool; identifying a key value stored in the key-value data structure matching the source node identifier associated with the first packet received from the in-line tool; and in response to identifying the key, identifying a payload data associated with the key matching the payload data identifier associated with the first packet received from the in-line tool.

7. The method of claim 1, further comprising:
   receiving a second packet, via the network port of the network switch appliance, from the source node, the second packet destined for the destination node;
   in response to a determination that the measured latency satisfies a specified criterion, selecting, by the network switch appliance, a second route for the second packet different from the first route; and
   forwarding, by the network switch appliance, the second packet for delivery to the destination node via the second route.

8. The method of claim 7, wherein the second route bypasses the in-line tool.

9. The method of claim 7, wherein the second route includes routing the second packet directly to the destination node.

10. The method of claim 7, wherein the second route includes an alternative in-line tool.

11. The method of claim 7, further comprising:
    identifying, by the processor of the network switch appliance, a particular session out of a plurality of sessions with which the second packet is associated; and
    forwarding, by the network switch appliance, other packets associated with the particular session via the second route.

12. The method of claim 7, further comprising:
    measuring, by the processor in the network switch appliance, a latency of the network traffic through the in-line tool over a time period; and
    calculating, by the processor in the network switch appliance, a threshold latency value including one or more of a minimum, maximum, or average latency of the network traffic through the in-line tool over the time period;
    wherein the specified criterion is based on the calculated threshold latency value.

13. The method of claim 12, wherein specified criterion is further based on a priority level of the network traffic.

14. The method of claim 7, further comprising:
    tracking, by the processor in the network switch appliance, changes in the measured latency of the network traffic through the in-line tool over a time period;
    defining, by the processor in the network switch appliance, a characteristic associated with the in-line tool based on the tracking; and
    adjusting, by the processor in the network switch appliance, the specified criterion based on the characteristic associated with the in-line tool.

15. The method of claim 14, wherein the characteristic associated with the in-line tool includes one or more of:
    a statistical measure of latency when processing a particular type of network traffic,
    a statistical measure of latency during particular time periods, or
    a statistical measure of a rate of change in latency under particular network traffic conditions.

16. A network switch appliance comprising: a processor; and
    a memory having instructions stored thereon, which when executed by the processor, cause the network switch appliance to:
    receive a first packet from a source node on a computer network, the first packet destined for a destination node on the computer network;
    forward the first packet to an in-line tool for processing via a first route;
    store information associated with the first packet as an entry in a key-value data structure, the entry including:
    a source node identifier associated with the source node as a key; and
    a payload data identifier and first timestamp as values associated with the key, the first timestamp based on a time of forwarding the first packet to the in-line tool;
    receive the first packet from the in-line tool after the processing;
    identify the first packet received from the in-line tool as the same first packet forwarded to the in-line tool based on the entry in the key-value data structure; and
    measure a latency in network traffic through the in-line tool based on a difference between the first timestamp and a second timestamp, the second timestamp based on a time of receiving the first packet from the in-line took.

17. The network switch appliance of claim 16, wherein the memory has further instructions stored thereon, which when executed by the processor, cause the network switch appliance to further:
redirect network traffic to bypass the in-line tool if the measured latency satisfies a specified criterion.

18. The network switch appliance of claim 16, wherein the memory has further instructions stored thereon, which when executed by the processor, cause the network switch appliance to further:
receive a second packet from the source node, the second packet destined for the destination node;
in response to a determination that the measured latency satisfies a specified criterion, select a second route for the second packet different from the first route and that bypasses the in-line tool; and
forward the second packet for delivery to the destination node via the second route.

19. A non-transitory machine-readable storage medium for use in a processing system, the non-transitory machine-readable storage medium storing instructions, execution of which in the processing system causes the processing system to perform operations comprising:
receiving a first packet from a source node on a computer network, the first packet destined for a destination node on the computer network;
forwarding the first packet to an in-line tool for processing via a first route;
storing information associated with the first packet as an entry in a key-value data structure, the entry including:
a source node identifier associated with the source node as a key; and
a payload data identifier and first timestamp as values associated with the key, the first timestamp based on a time of forwarding the first packet to the in-line tool;
receiving the first packet from the in-line tool after the processing;
identifying the first packet received from the in-line tool as the same first packet forwarded to the in-line tool based on the entry in the key-value data structure; and
measuring a latency in network traffic through the in-line tool based on a difference between the first timestamp and a second timestamp, the second timestamp based on a time of receiving the first packet from the in-line tool.

20. The non-transitory machine-readable storage medium of claim 19 storing further instructions, execution of which in the processing system causes the processing system to perform operations further comprising:
redirecting network traffic to bypass the in-line tool if the measured latency satisfies a specified criterion.

21. The non-transitory machine-readable storage medium of claim 19 storing further instructions, execution of which in the processing system causes the processing system to perform operations further comprising:
receiving a second packet from the source node, the second packet destined for the destination node;
in response to a determination that the measured latency satisfies a specified criterion, selecting a second route for the second packet different from the first route and that bypasses the in-line tool; and
forwarding the second packet for delivery to the destination node via the second route.

* * * * *